United States Patent
Gershfeld (12)
(10) Patent No.: US 6,591,033 B2
(45) Date of Patent: Jul. 8, 2003

(54) OPTICAL MATRIX SWITCHER

(76) Inventor: Jack Gershfeld, 615 Del Rio Way, Fullerton, CA (US) 92835

( * ) Notice: Subject to any disclaimer, the term of this patent is extended or adjusted under 35 U.S.C. 154(b) by 0 days.

(21) Appl. No.: 09/905,814

(22) Filed: Jul. 16, 2001

(65) Prior Publication Data

US 2002/0054730 A1 May 9, 2002

Related U.S. Application Data (60) Provisional application No. 60/245,943, filed on Nov. 6, 2000.

(51) Int. Cl.$^7$ .............................. G02B 6/26; G02B 6/42; G02B 6/32
(52) U.S. Cl. ............................. 385/21; 385/16; 385/17; 385/18; 385/19; 385/33
(58) Field of Search .............................. 385/16, 17, 18, 385/19, 33

(56) References Cited

U.S. PATENT DOCUMENTS

| | | | | |
|---|---|---|---|---|
| 4,253,728 A | * | 3/1981 | Venkatesan | 385/18 |
| 4,278,327 A | * | 7/1981 | McMahon et al. | 349/197 |
| 4,355,864 A | * | 10/1982 | Soref | 385/141 |
| 4,385,799 A | * | 5/1983 | Soref | 385/17 |
| 4,478,494 A | * | 10/1984 | Soref | 359/320 |
| 4,516,837 A | * | 5/1985 | Soref et al. | 349/196 |
| 4,815,827 A | * | 3/1989 | Lane | 349/196 |
| 4,828,362 A | * | 5/1989 | Skinner et al. | 385/18 |
| 4,830,444 A | * | 5/1989 | Cloonan et al. | 359/107 |
| 4,989,941 A | * | 2/1991 | Soref | 385/16 |
| 5,686,979 A | * | 11/1997 | Weber et al. | 349/96 |
| 5,963,682 A | * | 10/1999 | Dorschner et al. | 349/159 |
| 6,275,626 B1 | * | 8/2001 | Laor | 385/16 |
| 6,345,132 B1 | * | 2/2002 | Picard et al. | 385/125 |
| 6,430,334 B1 | * | 8/2002 | Ishikawa et al. | 385/16 |

* cited by examiner

*Primary Examiner*—Brian Healy
*Assistant Examiner*—Tina M Lin
(74) *Attorney, Agent, or Firm*—Vladimir Khiterer

(57) ABSTRACT

An optical matrix switcher which does not use mechanical means of optical alignment of input and output fibers in order to accomplish switching is disclosed. The optical matrix switcher of the present invention comprises a number of input assemblies, a number of output assemblies and a screen disposed between the input assemblies and output assemblies. The input assemblies are in an optical connection with inputs of the optical matrix switcher and the output assemblies are in an optical connection with the outputs of the optical matrix switcher. The input and output assemblies each comprise beam shaping means. A beam of light that passes through the beam shaping means is shaped and compressed into a plane ("shaped beams").

The screen (which is opaque and does not permit the light to pass through) comprises a number of switching means. The switching means can be placed in an "on" or "off" position. The switching means in the "on" position create openings in the screen permitting the light to pass through the screen. The shaped beams coming out of the input assemblies can be placed in an optical connection with output assemblies via the openings in the screen created by the switching means in the "on" position in a way that a signal (light) from any input of the optical matrix switcher can be sent to any output by placing the corresponding switching means in the "on" position.

12 Claims, 6 Drawing Sheets

OPTICAL MATRIX SWITCHER

CROSS REFERENCE TO THE RELATED APPLICATION

This patent application claims the benefit of priority from the following provisional application:
Application No: 60/245,943
Filing date: Nov. 6, 2000
Inventor: GERSHFELD, Jack
Title: OPTICAL MATRIX SWITCHER
No new matter has been added to this application.

BACKGROUND OF THE INVENTION

This invention relates to optical switchers, and more specifically, to an optical matrix switcher for routing and distribution of optical signals from multiple input sources to multiple output devices. Matrix switchers for electrical signals are widely used in applications requiring signal routing and distribution from multiple input sources to multiple output devices. For example, a video presentation system may include several input sources, such as video cameras, VCRs, computers and the like, and several output devices, such as computer monitors, projectors, etc. A matrix switcher would be used to connect the input sources to output devices and distribute and manipulate signals between inputs and outputs in desired combinations. This is accomplished by way of switching means connected to inputs and outputs contained in a matrix switcher, which can be turned "on" or "off" depending on the need.

Fiberoptic technology allows signal transmission through optical fibers, which presents advantages over electrical transmission methods by providing high bandwidth and electrical isolation. It is therefore desirable to provide an optical matrix switcher which would have the same ability of routing and distribution of optical signals from multiple input sources to multiple output devices as matrix switchers for electrical signals.

OVERVIEW OF THE PRIOR ART

Prior art accomplishes switching of optical signals by way of optical aligning, in some fashion, input and output optical fibers. For example, Lee (U.S. Pat. No. 4,834,488) aligns two fixed input optical fibers with two movable output optical fibers which are capable of changing positions. Aoyama (U.S. Pat. No. 4,239,331) employs a transparent dielectric plate capable of moving between switching positions, which provides optical connection between the input and output optical fibers. Minowa (U.S. Pat. No. 4,322,126) uses dielectric light-transmitting members movable by an electrically-controlled mechanism to provide optical connection between the input and output optical fibers. Winzer (U.S. Pat. No. 4,452,507) uses electromagnetic forces to move two movable fibers between two stoppers, thus providing optical connection with fixed fibers. Antell (U.S. Pat. No. 4,220,396) accomplishes optical connection between two pairs of movable fibers by moving them in two perpendicular directions. Hodge (U.S. Pat. No. 2,229,068) rotates a cylindrical member with respect to another cylindrical member in order to switch optical connections between the fibers in the cylindrical members. There are numerous other examples of how prior art accomplishes switching of optical signals, all of which involve optical alignment of input and output fibers by some mechanical means.

SUMMARY OF THE INVENTION

This invention is directed to an optical matrix switcher which does not use mechanical means of optical alignment of input and output fibers in order to accomplish switching. Rather, it comprises a number of input assemblies, each comprising a first input means optically connected to an input of an input beam shaping means and a first output means optically connected to an output of the input beam shaping means. The first input means can be a fiber conducting light and the first output means can be a lens. The input beam shaping means comprises a number of lenses having specific optical properties and disposed inside the input beam shaping means in a way that a beam of light irradiating the first input means will pass between the input and the output of the input beam shaping means and come out of the first output means shaped and compressed into a plane ("shaped beams").

As a result, when a beam irradiates one of the first input means, the shaped beam coming out of the first output means disposed on the input beam shaping means to which the first input means is connected, carries the same information as the beam irradiating the first input means.

An output assembly is substantially a mirror image of the input assembly. It comprises a number of beam shaping means, each having a second input means optically connected to the input of the beam shaping means, as well as a second output means optically connected to the output of the beam shaping means. The second input means can be a lens and the second output means can be a fiber conducting light.

A screen with a number of switching means is disposed between the first output means in the input assemblies and the second input means in the output assemblies. The switching means can be placed in an "on" and "off" positions. In the "on" position, switching means create an opening in the screen permitting light to pass through the screen. In the "off" position, switching means close the screen and prevent light from passing through the screen.

Each opening in the screen created by the switching means in the "on" position is in an optical alignment with one of the first output means and one of the second input means, so that each of the first output means can be placed in an optical connection with any of the second input means by way of placing the corresponding switching means in the "on" position. Accordingly, a signal (light) from any of the first input means can be sent to any of the second output means via the corresponding switching means in the "on" position.

The advantages of this invention will be better understood with the reference to the following drawing figures and description of the preferred embodiments of this invention. The same numerals indicate the same elements in all drawing figures. The same letters indicates the same points in all drawing figures.

DETAILED DESCRIPTION OF THE DRAWING FIGURES

Figure 1:
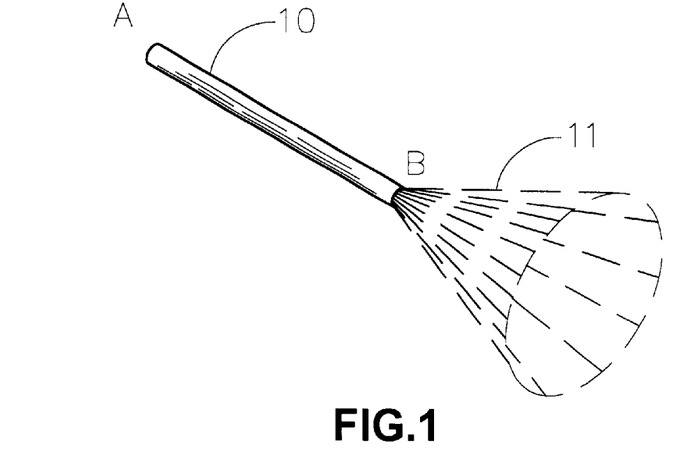
FIG. 1 is an illustration of a fiber and a beam of light coming out of the fiber

Referring to FIG. 1, numeral 10 indicates Fiber. Numeral 11 indicates Beam coming out of Fiber 10 at point B when Fiber 10 is irradiated with light at point A. Beam 11 has a generally conical shape.

Figure 2:
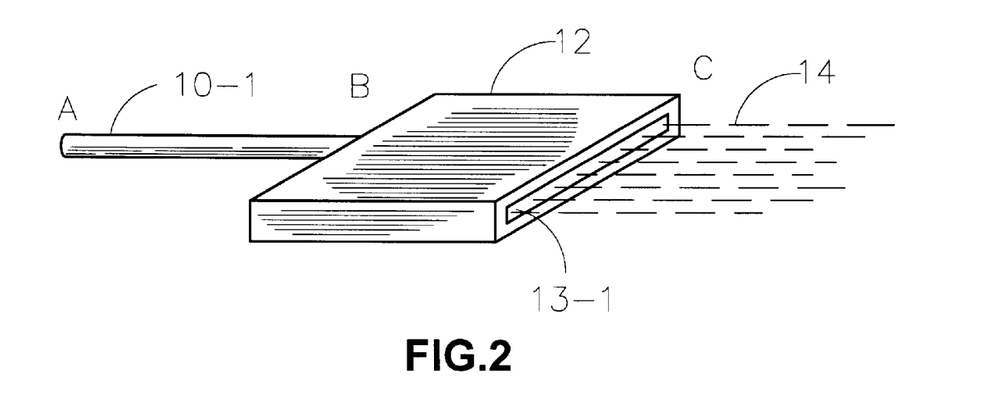
FIG. 2 is an illustration of a fiber attached to a beam shaping means (which forms the input or output assembly of the present invention) and a shaped beam coming out of the beam shaping means

Referring to FIG. 2, numeral 12 indicates Beam Shaping Means. Numeral 13 indicates Input/Output Lens. Beam Shaping Means 12 has an input at point B and an output at point C. Beam Shaping Means 12 also comprises a number of lenses disposed inside Beam Shaping Means 12.

Numeral 10-1 indicates First Input Means, which is shown as a fiber identical to Fiber 10. First Input Means 10-1 is connected to the input of Beam Shaping Means 12. Numeral 13-1 indicates First Output Means, which is shown as a lens. First Output Means 13-1 is connected to the output of Beam Shaping Means 12.

The lenses disposed inside Beam Shaping Means 12 have specific optical properties and are located in a way that light irradiating First Input Means 10-1 at point A, after passing through Beam Shaping Means 12 between points B and C and coming out of First Output Means 13-1 at point C becomes shaped and compressed into a plane. Numeral 14 indicates Shaped Beam coming out of First Output Means 13-1 at point C when First Input Means 10-1 is irradiated with light at point A. Shaped Beam 14 has a generally flat and straight shape (as opposed to the generally conical shape of Beam 11 shown in FIG. 1).

Figure 3:
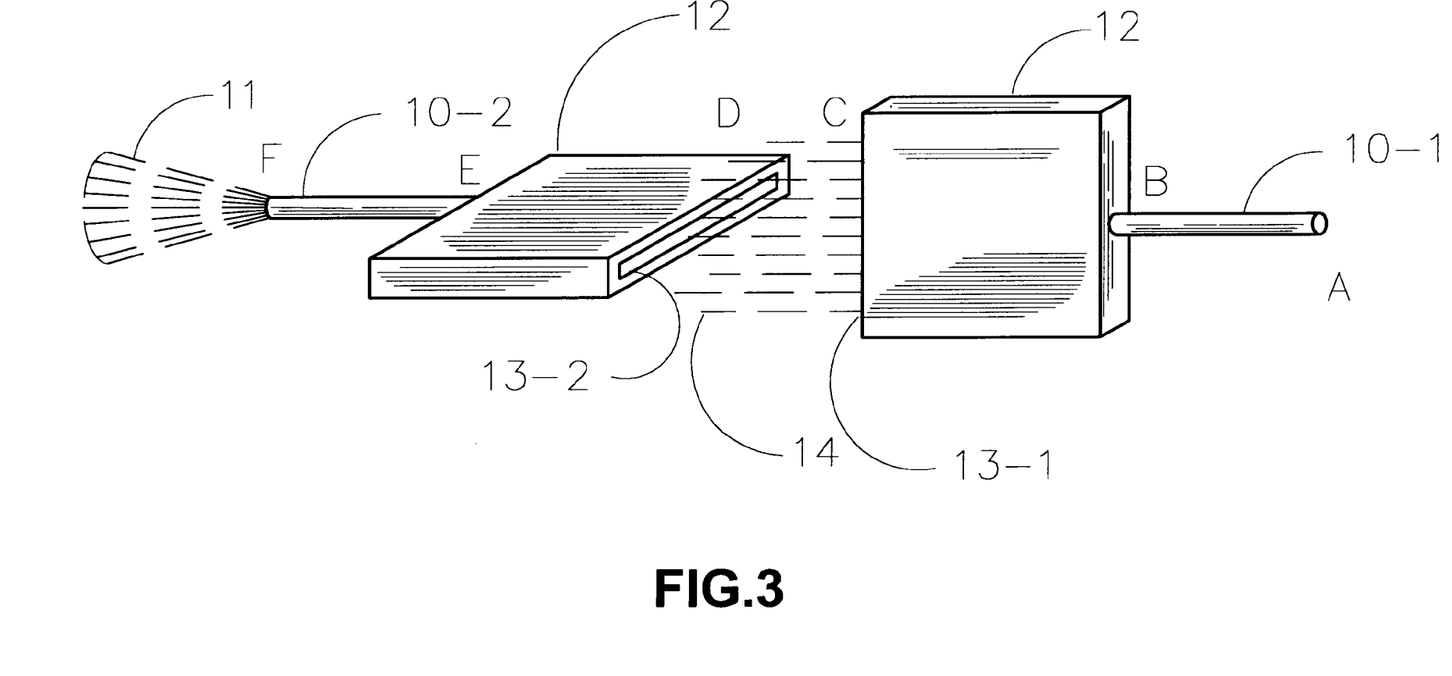
FIG. 3 is an illustration of an input assembly, an output assembly and a beam as it travels from input assembly to output assembly

Referring to FIG. 3, viewing the right portion of FIG. 3, Beam Shaping Means 12, First Input Means 10-1 and First Output Means 13-1 between points A and C comprise Input Assembly. Viewing the left portion of FIG. 3, numeral 13-2 indicates Second Input Means. Numeral 10-2 indicates Second Output Means. Beam Shaping Means 12, Second Input Means 13-2 and Second Output Means 10-2 between points D and F comprise Output Assembly.

Still referring to FIG. 3, when First Input Means 10-1 is irradiated with light at point A, Shaped Beam 14 comes out of First Output Means 13-1 at point C. Beam 14 irradiates Second Input Means 13-2 at point D, passes through Beam Shaping Means 12 of the Output Assembly between points D and E and comes out of Second Output Means 13-2 as Beam 11 at point F.

Still referring to FIG. 3, it should be noted that since Shaped Beam 14 has a generally flat and straight shape, it will form optical connection with Second Input Means 13-2 as long as any portion of Shaped Beam 14 irradiates any portion of Second Input Means 13-2. Therefore, Input Assembly can be moved up or down and left or right with respect to Output Assembly without losing optical connection with Output Assembly as long as Shaped Beam 14 irradiates Second Input Means 13-2 at any place.

Still referring to FIG. 3, it should also be noted that Input Assembly and Output Assembly are substantially a mirror image of one another. Specifically, if Second Output Means 10-2 is irradiated with light at point F, Shaped Beam 14 will come out of Second Input Means 13-2 at point D. Beam 14 will irradiate First Output Means 13-1 at point C, pass through Beam Shaping Means 12 between points C and B and come out of First Input Means 10-1 of at point A.

Figure 4:
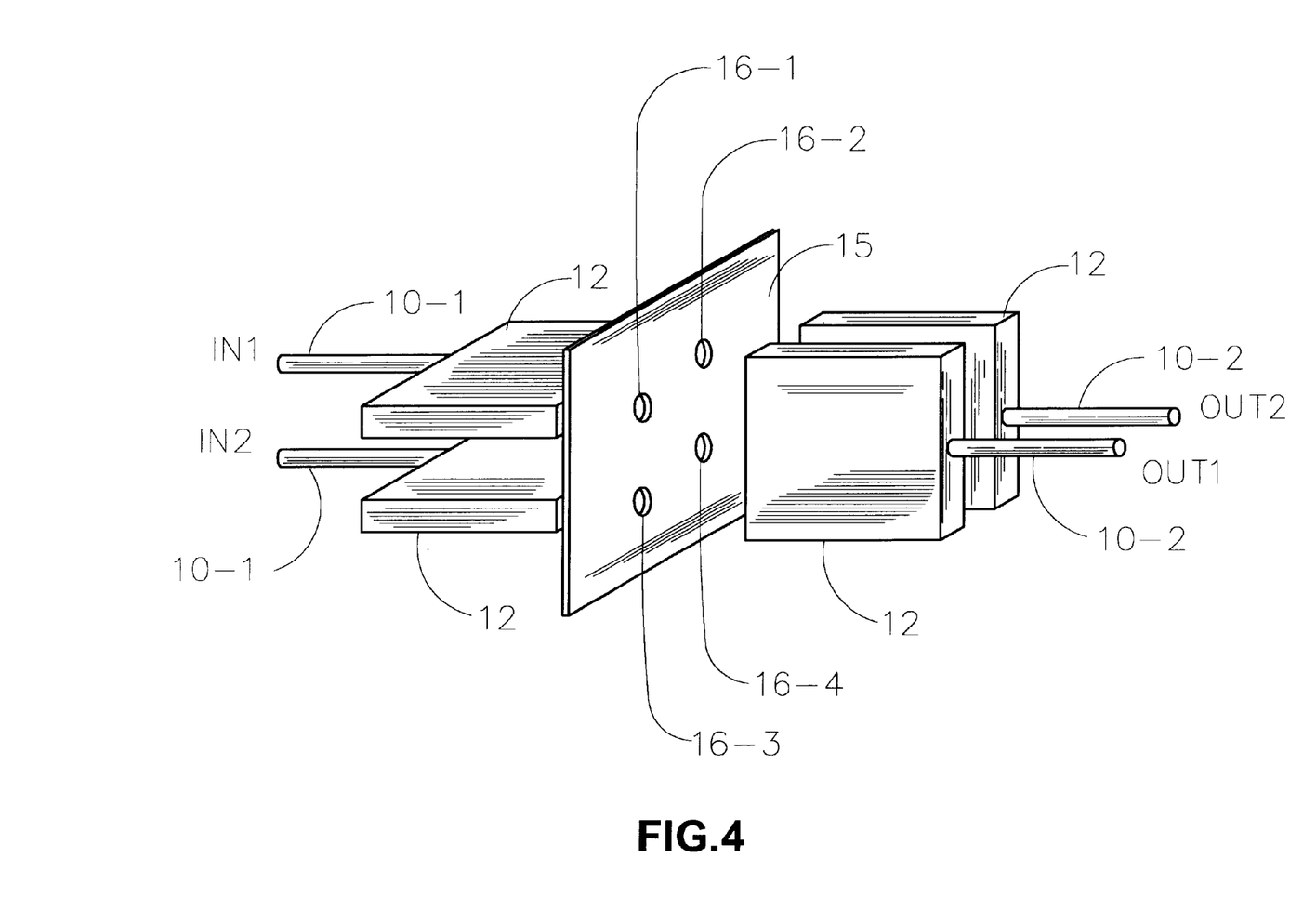
FIG. 4 is an illustration of a perspective view of a 2×2 optical matrix switcher of the present invention
Figure 5:
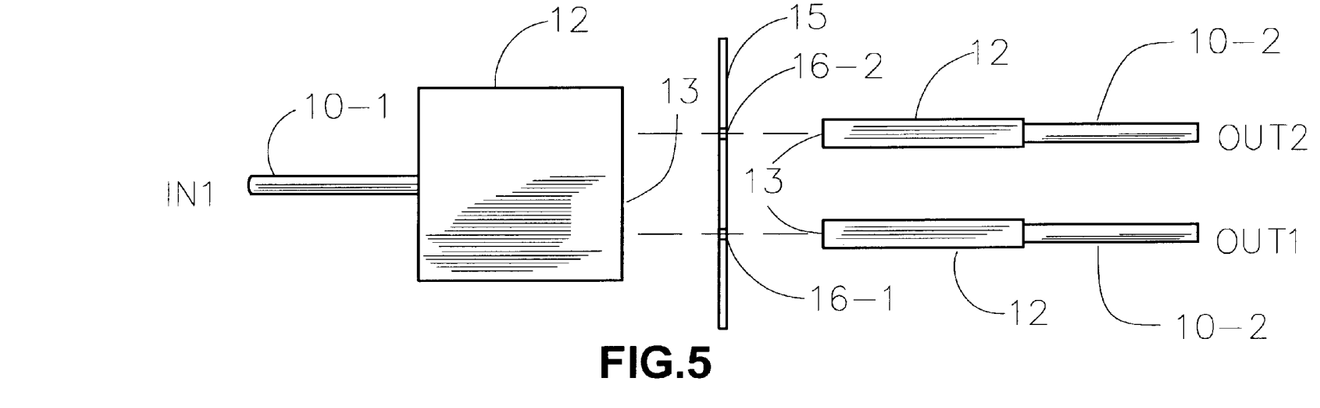
FIG. 5 is an illustration of a top plan view of a 2×2 optical matrix switcher of the present invention
Figure 6:
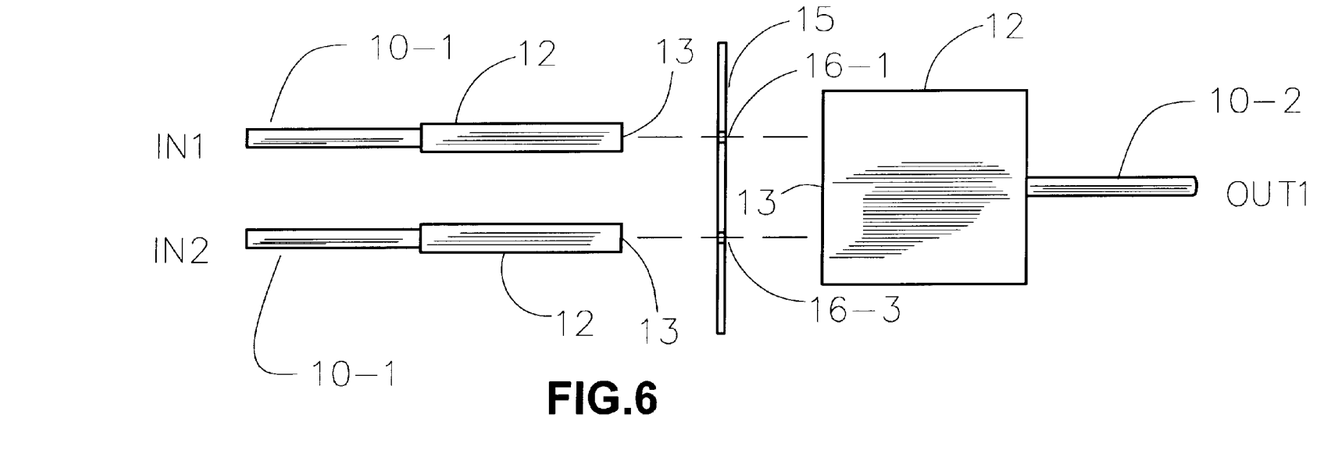
FIG. 6 is an illustration of a side elevation view of a 2×2 optical matrix switcher of the present invention

Referring to FIG. 4, FIG. 5 and FIG. 6, there is shown a 2×2 optical matrix switcher of the present invention. It has two inputs IN1 and IN2 and two outputs OUT1 and OUT2. Optical Matrix Switcher shown in FIG. 4, FIG. 5 and FIG. 6 has two Input Assemblies on the left of FIG. 4, FIG. 5 and FIG. 6 and two Output Assemblies on the right of FIG. 4, FIG. 5 and FIG. 6, so that each of the two inputs IN1 and IN2 corresponds to Input Assembly and each of the outputs OUT1 and OUT2 corresponds to Output Assembly.

Still referring to FIG. 4, FIG. 5 and FIG. 6, numeral 15 indicates Screen. Screen 15 comprises a substantially opaque material that prevents light from passing through Screen 15. Screen 15 is disposed between First Output Means 13-1 and Second Input Means 13-2. Numerals 16-1, 16-2, 16-3 and 16-4 indicate Switching Means disposed in Screen 15.

Still referring to FIG. 4, FIG. 5 and FIG. 6, Switching Means 16-1, 16-2, 16-3 and 16-4 can be placed in the "on" and "off" positions. In the "on" position, each of Switching Means 16-1, 16-2, 16-3 and 16-4 creates a substantially transparent opening in Screen 15 permitting light to pass through Screen 15. In the "off" position, Switching Means 16-1, 16-2, 16-3 and 16-4 close Screen 15 and prevent light from passing through Screen 15. As should be apparent to the persons knowledgeable in the pertinent arts, Switching Means 16-1, 16-2, 16-3 and 16-4 can comprise shutters to accomplish this result.

Each of Switching Means 16-1, 16-2, 16-3 and 16-4 is in an optical alignment with one First Output Means 13-1 and one Second Input Means 13-2. That is, imaginary lines perpendicular to the plane of Screen 15 going through each of Switching Means 16-1, 16-2, 16-3 and 16-4 will touch one First Output Means 13-1 and one Second Input Means 13-2. As such, each one of First Output Means 13-1 can be placed in optical connection with any of Second Input Means 13-2 by way of placing the corresponding Switching Means 16-1, 16-2, 16-3 and 16-4 in the "on" position.

For example, if Switching Means 16-1 is in the "on" position and Switching Means 16-2, 16-3 and 16-4 are in the "off" position, light irradiating IN1 will be sent to OUT1. Similarly, a signal (light) from any of the inputs IN1 and IN2 can be sent to any of the output OUT1 and OUT2 via the corresponding Switching Means 16-1, 16-2, 16-3 and 16-4 in the "on" position.

Referring to FIG. 7, FIG. 8, FIG. 9 and FIG. 10 there is shown the preferred embodiment of the 2×2 optical matrix switcher of the present invention. Numeral 17 indicates LCD Screen. LCD Screen 17 serves the same function as Screen 15 in FIG. 4, FIG. 5 and FIG. 6, only it further comprises an LCD (Liquid Crystal Display) panel. Numerals 18-1, 18-2, 18-3 and 18-4 indicate LCD pixels Switching Means disposed in Screen 17. LCD pixels Switching Means 18-1, 18-2, 18-3 and 18-4 serve the same function as Switching Means 16-1, 16-2, 16-3 and 16-4 in FIG. 4, FIG. 5 and FIG. 6.

It is well known to the persons knowledgeable in the pertinent arts that by applying a proper electrical signal to pixels in an LCD panel, the pixels can be made substantially opaque. Applying a different type of electrical signal to pixels in an LCD panel will cause the pixels to be substantially transparent. Accordingly, LCD pixels Switching Means 18-1, 18-2, 18-3 and 18-4 can be placed in the "off" and "on" position by making them opaque or transparent.

Figure 7:
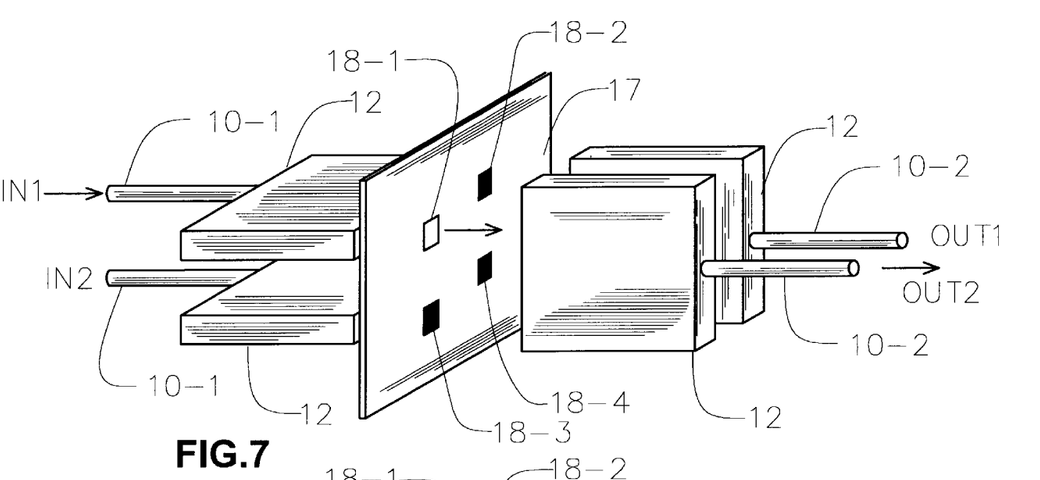
FIG. 7 through FIG. 10 are illustrations of perspective views of the preferred embodiment of the 2×2 optical matrix switcher of the present invention

Referring to FIG. 7, LCD Pixels Switching Means 18-1 is "on" (transparent) and LCD Pixels Switching Means 18-2, 18-3 and 18-4 are "off" (opaque). This will cause the signal applied to the input IN1 to travel to the output OUT2.

Figure 8:
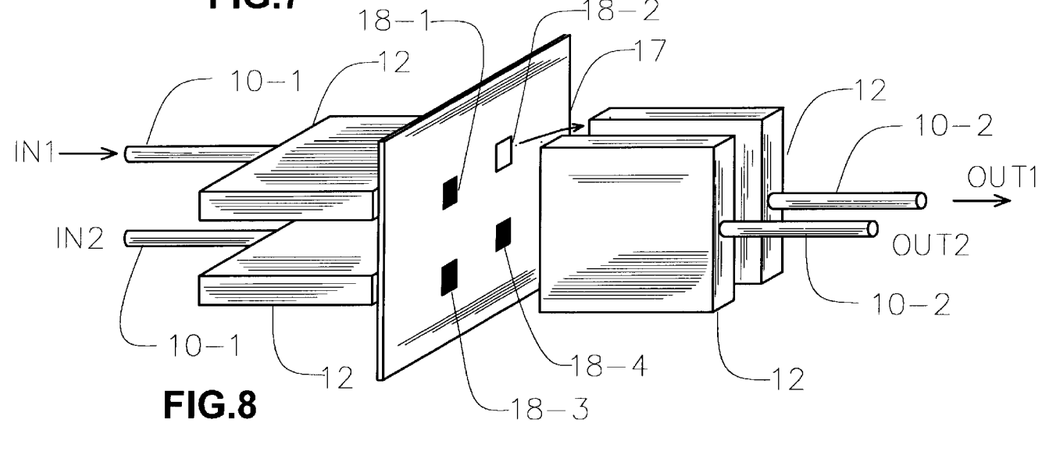

Referring to FIG. 8, LCD Pixels Switching Means 18-2 is "on" (transparent) and LCD Pixels Switching Means 18-1, 18-3 and 18-4 are "off" (opaque). This will cause the signal applied to the input IN1 to travel to the output OUT1.

Figure 9:
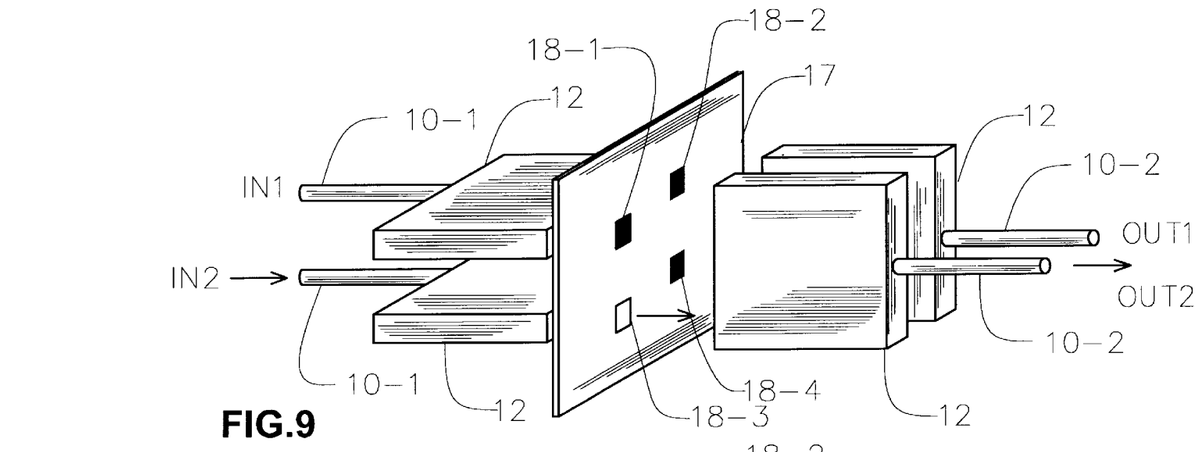

Referring to FIG. 9, LCD Pixels Switching Means 18-3 is "on" (transparent) and LCD Pixels Switching Means 18-1, 18-2 and 18-4 are "off" (opaque). This will cause the signal applied to the input IN2 to travel to the output OUT2.

Figure 10:
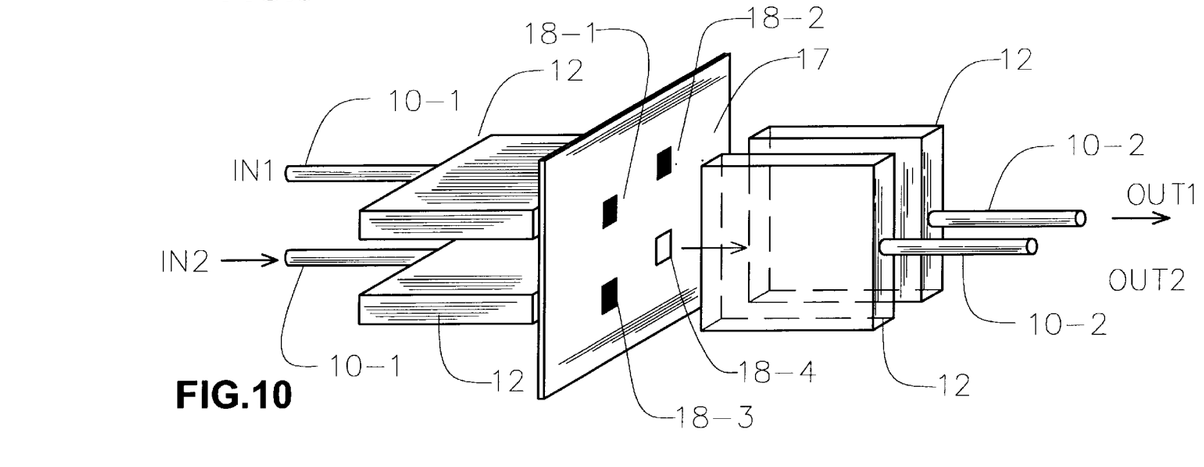

Referring to FIG. 10, LCD Pixels Switching Means 18-4 is "on" (transparent) and LCD Pixels Switching Means 18-1, 18-2 and 18-3 are "off" (opaque). This will cause the signal applied to the input IN2 to travel to the output OUT1.

As can be seen the optical matrix switcher of the present invention can route a signal from any input to any output. Further, FIG. 4, FIG. 5 and FIG. 6 as well as FIG. 7, FIG. 8, FIG. 9 and FIG. 10 show a 2×2 (2 input and 2 output) optical matrix switcher of the present invention for the sake of simplicity. However, the optical matrix switcher of the present invention can have any number of inputs and outputs.

First Input Means 10-1 and Second Output Means 10-2 can further comprise a fiber. First Output Means 13-1 and Second Input Means 13-2 can further comprise a lens. It is preferable, but not necessary that Screen 15 is disposed between First Output Means 13-1 and Second Input Means 13-2 in a way that the plane of Screen 15 is substantially perpendicular to the planes of each of Shaped Beams 14 coming out of First Output Means 13-1. It is also preferable, but not necessary that the Input Assemblies are disposed in a way that the planes of each of Shaped Beams 14 coming out of First Output Means 13-1 are substantially parallel to each other.

While the present invention has been described and defined by reference to the preferred embodiments of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. An optical matrix switcher comprising:

a plurality of input assemblies, a plurality of output assemblies, a screen disposed between said input assemblies and said output assemblies;

each of said input assemblies comprising an input beam shaping means, a first input means, a first output means;

said input beam shaping means comprising an input and an output so that said first input means is optically connected to the input of said input beam shaping means and said first output means is optically connected to the output of said input beam shaping means;

said input beam shaping means further comprising a plurality of lenses having specific optical properties and disposed within said input beam shaping means in a way that a beam of light irradiating said first input means will pass between the input and output of said input beam shaping means and come out of said first output means in the form of a shaped beam, said shaped beam shaped into a plane;

each of said output assemblies comprising an output beam shaping means, a second input means, a second output means;

said output beam shaping means comprising an input and an output so that said second input means is optically connected to the input of said output beam shaping means and said second output means is optically connected to the output of said output beam shaping means;

each of said output beam shaping means further comprising a plurality of lenses having specific optical properties and disposed within said output beam shaping means in a way that the shaped beam irradiating said second input means will pass between the input and output of said output beam shaping means and come out of said second output means in the form of a beam of light carrying the same information as the shaped beam irradiating said second input means;

said output assemblies and said input assemblies are disposed with respect to each other in a way that in the absence of said screen, each of said first output means can be placed in an optical connection with each of said second input means by way of said shaped beams coming out of said first output means and irradiating said second input means;

said screen comprising a substantially opaque material preventing optical connection between said first output means and said second input means when said shaped beams come out of said first output means;

said screen further comprising a plurality of switching means in a way that said switching means can be placed in an "on" position or in an "off" position, so that when any of said switching means is placed in the "on" position, it creates a substantially transparent opening in said screen permitting light to pass through said screen and when any of said switching means is placed in the "off" position, it maintains the opaque properties of said screen and does not permit light to pass through said screen;

said switching means are disposed in said screen in a way that each of the substantially transparent openings created by each of said switching means placed in the "on" position is in an optical alignment with one of said first output means and one of said second input means, such that any of said first output means can be placed in an optical connection with any of said second input means by way of placing a selected switching means in the "on" position and permitting said shaped beam coming out of a selected first output means to pass through the substantially transparent opening in said screen created by the selected switching means and irradiate a selected second input means, thus permitting a beam of light from any of the first input means to be sent to any of the second output means via the corresponding switching means in the "on" position.

2. An optical matrix switcher as in claim 1, wherein said screen further comprises a liquid crystal display and said switching means further comprise pixels in the liquid crystal display, such that applying a proper electrical signal to said pixels can place said switching means in the "on" or "off" position by causing said pixels to be substantially opaque or substantially transparent.

3. An optical matrix switcher as in claim 1, wherein said input assemblies are disposed in a way that planes of each of the shaped beams coming out of said first output means are substantially parallel to each other.

4. An optical matrix switcher as in claim 2, wherein said input assemblies are disposed in a way that planes of each of the shaped beams coming out of said first output means are substantially parallel to each other.

5. An optical matrix switcher as in claim 3, wherein said screen is disposed between said first output means and said second input means in a way that the plane of said screen is substantially perpendicular to the planes of each of said shaped beams.

6. An optical matrix switcher as in claim 4, wherein said screen is disposed between said first output means and said second input means in a way that the plane of said screen is substantially perpendicular to the planes of each of said shaped beams.

7. An optical matrix switcher as in claim 1, wherein said first input means further comprises a fiber, said first output means further comprises a lens, said second input means further comprises a lens and said second output means further comprise a fiber.

8. An optical matrix switcher as in claim 2, wherein said first input means further comprises a fiber, said first output means further comprises a lens, said second input means further comprises a lens and said second output means further comprise a fiber.

9. An optical matrix switcher as in claim 3, wherein said first input means further comprises a fiber, said first output means further comprises a lens, said second input means further comprises a lens and said second output means further comprise a fiber.

10. An optical matrix switcher as in claim 4, wherein said first input means further comprises a fiber, said first output means further comprises a lens, said second input means further comprises a lens and said second output means further comprise a fiber.

11. An optical matrix switcher as in claim 5, wherein said first input means further comprises a fiber, said first output means further comprises a lens, said second input is means further comprises a lens and said second output means further comprise a fiber.

12. An optical matrix switcher as in claim 6, wherein said first input means further comprises a fiber, said first output means further comprises a lens, said second input means further comprises a lens and said second output means further comprise a fiber.

* * * * *